(12) United States Patent
Weder et al.

(10) Patent No.: US 8,979,362 B2
(45) Date of Patent: Mar. 17, 2015

(54) CIRCUIT AND METHOD FOR SENSING A PHYSICAL QUANTITY, AN OSCILLATOR CIRCUIT, A SMARTCARD, AND A TEMPERATURE-SENSING CIRCUIT

(75) Inventors: Uwe Weder, Au (DE); Korbinian Engl, Kirchasch (DE)

(73) Assignee: Infineon Technologies AG, Neubiberg (DE)

( * ) Notice: Subject to any disclaimer, the term of this patent is extended or adjusted under 35 U.S.C. 154(b) by 215 days.

(21) Appl. No.: 13/396,923

(22) Filed: Feb. 15, 2012

(65) Prior Publication Data
US 2013/0208763 A1 Aug. 15, 2013

(51) Int. Cl.
| G01K 11/00 | (2006.01) |
|---|---|
| G01D 5/243 | (2006.01) |
| G01K 7/32 | (2006.01) |
| G06K 19/07 | (2006.01) |

(52) U.S. Cl.
CPC ........ *G01K 7/32* (2013.01); *G01D 5/243* (2013.01); *G06K 19/0717* (2013.01)
USPC .............................. 374/117; 374/170; 374/1

(58) Field of Classification Search
USPC .............................................. 374/117, 170, 1
See application file for complete search history.

(56) References Cited

U.S. PATENT DOCUMENTS

| 4,159,622 | A * | 7/1979 | Akahane ........................ 368/85 |
|---|---|---|---|
| 5,795,068 | A * | 8/1998 | Conn, Jr. ........................ 374/170 |
| 6,078,208 | A | 6/2000 | Nolan et al. |
| 6,695,475 | B2 * | 2/2004 | Yin ................................ 374/171 |
| 6,707,629 | B1 | 3/2004 | Jiang et al. |
| 7,235,987 | B2 * | 6/2007 | Sugino et al. ................. 324/691 |
| 7,563,023 | B2 * | 7/2009 | Kuo et al. ...................... 374/170 |
| 7,592,876 | B2 | 9/2009 | Newman |
| 7,619,486 | B1 * | 11/2009 | Lesea ............................ 331/176 |
| 7,733,189 | B1 * | 6/2010 | Bennett ........................... 331/64 |
| 7,831,873 | B1 * | 11/2010 | Trimberger et al. ........... 714/725 |
| 7,859,421 | B2 * | 12/2010 | Berthold et al. ............... 340/653 |
| 8,729,978 | B2 * | 5/2014 | Akaike et al. ................. 331/176 |
| 2003/0001660 | A1 | 1/2003 | Yang |
| 2003/0155903 | A1 * | 8/2003 | Gauthier et al. ............ 324/76.41 |
| 2004/0037346 | A1 * | 2/2004 | Rusu et al. .................... 374/121 |
| 2004/0159904 | A1 * | 8/2004 | Clabes et al. ................. 257/467 |
| 2006/0082410 | A1 | 4/2006 | Khan et al. |
| 2006/0285576 | A1 * | 12/2006 | Gyoten et al. ................. 374/178 |
| 2007/0057734 | A1 * | 3/2007 | Ruby ............................... 331/2 |
| 2007/0195856 | A1 * | 8/2007 | Blom et al. .................... 374/117 |

(Continued)

FOREIGN PATENT DOCUMENTS

DE 2429440 C3 1/1978

*Primary Examiner* — Mirellys Jagan
(74) *Attorney, Agent, or Firm* — Eschweiler & Associates, LLC (57) ABSTRACT

A circuit for sensing a physical quantity according to an embodiment of the present invention includes a first oscillator circuit configured to provide a first clock signal including a first frequency depending on the physical quantity, and a second oscillator circuit configured to provide a second clock signal comprising a second frequency depending on the physical quantity. The circuit also includes a frequency comparator circuit configured to provide a frequency signal indicative of the physical quantity, the frequency signal being based on the first and second frequencies, wherein the first and second oscillator circuits are configured to provide the first and second clock signals such that due to a change in the physical quantity one frequency of the first and second frequencies increases, while the other frequency of the first and second frequencies decreases.

22 Claims, 8 Drawing Sheets

(56) References Cited

U.S. PATENT DOCUMENTS

| | | | |
|---|---|---|---|
| 2007/0290763 A1* | 12/2007 | Partridge et al. | 331/154 |
| 2008/0238563 A1* | 10/2008 | Kim et al. | 331/176 |
| 2010/0289480 A1* | 11/2010 | Soramoto et al. | 324/85 |
| 2012/0229220 A1* | 9/2012 | Quevy et al. | 331/41 |
| 2013/0129114 A1* | 5/2013 | Lesso | 381/98 |
| 2013/0156069 A1* | 6/2013 | Yun et al. | 374/170 |

* cited by examiner

CIRCUIT AND METHOD FOR SENSING A PHYSICAL QUANTITY, AN OSCILLATOR CIRCUIT, A SMARTCARD, AND A TEMPERATURE-SENSING CIRCUIT

FIELD

Embodiments according to the present invention relate to a circuit and a method for sensing a physical quantity, an oscillator circuit, a smartcard, and a temperature-sensing circuit.

BACKGROUND

In many applications, sensing a physical quantity, such as a temperature, is useful, sometimes even necessary because of a wide range of possible reasons. For instance, sensing a temperature outside of a predefined range of temperatures may represent an undesired state of a system. Such a temperature may for instance be caused by a malfunction of the system or a distortion or deviation of the environmental conditions from their specified tolerances. For instance, in case of an integrated circuit, sensing an exceeded temperature beyond a predefined temperature range may indicate that the system is producing too much heat or that the heat produced cannot be removed adequately.

In some applications, such a deviation from a specified temperature range may also be indicative of an attempt to break the system security or to tamper with the system.

The same may also apply to other physical quantities.

Conventionally, a sensor typically employs a sensor element, which transfers the physical quantity to be measured into an electrical signal, which is then compared to a fixed, predefined signal having a constant property.

However, providing such a fixed, predetermined signal often represents a significant challenge, since a signal source for such a signal typically relies on a specific physical effect, which in turn may depend on intrinsic material properties or extrinsic parameters such as shape, dimensions or the like.

To utilize the physical effect, the signal source is typically driven in a closed-feedback loop configuration to maintain the fixed, predefined signal. However, it may be advisable or sometimes even necessary to implement further circuitries and components to cope with drifts and other distortions of operating parameters.

In some applications, the physical effect requires an implementation of a specific structure, which may be difficult to implement in a given environment. Both may give rise to additional circuitries or complex structures to incorporate.

Therefore, a demand exists to provide an infrastructure for sensing a physical quantity with a reduced complexity.

SUMMARY

A circuit for sensing a physical quantity according to an embodiment of the present invention comprises a first oscillator circuit operable to provide a first clock signal comprising a first frequency depending on the physical quantity. The circuit further comprises a second oscillator circuit operable to provide a second clock signal comprising a second frequency depending on the physical quantity and a frequency comparator circuit operable to provide a frequency signal indicative of the physical quantity. The frequency signal is based on the first and second frequencies. The first and second oscillator circuits are further operable to provide the first and second clock signals such that due to a change in the physical quantity one frequency of the first and second frequencies increases, while the other frequency of the first and second frequencies decreases.

By employing a circuit for sensing a physical quantity according to an embodiment of the present invention, it may be possible to reduce the complexity by employing two oscillator circuits each with a pronounced frequency dependency of the physical quantity. Since the frequency dependencies differ as outlined above, in a circuit according to an embodiment of the present invention the second clock signal may be used to convey information on the physical quantity instead of just providing a stabilized time basis by outputting a fixed, predefined reference signal.

An oscillator circuit according to an embodiment of the present invention comprises an oscillation generator operable to provide a clock signal. The oscillation generator comprises a comparator with a first input and a second input. The oscillator circuit further comprises a current source coupled to the first input of the comparator and operable to provide a current. The current comprises a magnitude depending on the physical quantity. The oscillator circuit further comprises a reference signal circuit coupled to the second input of the comparator and operable to provide a reference signal, which also comprises a magnitude depending on the physical quantity. The current source and the reference signal circuit are operable to provide the current and the reference signal, respectively, such that due to a change in the physical quantity the magnitude of the current or of the reference signal increases, while the other magnitude of the current and the reference signal decreases.

By employing an oscillator circuit according to an embodiment of the present invention, it may also be possible to reduce the complexity of such a circuit by using the current source and the reference signal circuit having the described dependencies on the physical quantity. In other words, instead of comparing the magnitude of the current source to a fixed current or a fixed voltage, an oscillator circuit according to an embodiment of the present employs the reference signal circuit, which itself shows a pronounced dependency on the physical quantity and hence carries information on the physical quantity. Therefore, an infrastructure necessary to provide a fixed and constant reference signal may be omitted.

BRIEF DESCRIPTION OF THE DRAWINGS

Several embodiments of the present invention will be described in the enclosed Figures.

FIG. 6b shows a temperature dependency of a ratio of the frequency/temperature characteristics of the oscillator circuits shown in FIG. 6a;

FIG. 10b shows a temperature dependency of a ratio of the frequency/temperature characteristics of the oscillator circuits shown in FIG. 10a;

DETAILED DESCRIPTION

In the following, embodiments according to the present invention will be described in more detail. In this context, summarizing reference signs will be used to describe several objects simultaneously or to describe common features, dimensions, characteristics, or the like of these objects. The summarizing reference signs are based on their individual reference signs. Moreover, objects appearing in several embodiments or several figures, but which are identical or at least similar in terms of at least some of their functions or structural features, will be denoted with the same or similar reference signs. To avoid unnecessary repetitions, parts of the description referring to such objects also relate to the corresponding objects of the different embodiments or the different figures, unless explicitly or—taking the context of the description and the figures into account—implicitly stated otherwise. Therefore, similar or related objects may be implemented with at least some identical or similar features, dimensions, and characteristics, but may be also implemented with differing properties.

Smartcards are used in wide range of applications to protect certain goods, such as privileges or access to certain facilities and information. For instance, smartcards may be used to protect buildings, laboratories and other areas from unauthorized access. They may be also used to protect access to an account. Smartcards typically comprise an integrated circuit (IC), which is operable to perform the task of the respective smartcard. However, depending on the value of the goods protected by the smartcard, the smartcard itself may be the target of attacks or attempts to tamper with its content. As a consequence, it may comprise security measures to protect it and, as a consequence, the goods it is intended to protect.

A smartcard may comprise a processor or another form of an integrated circuit. Hence, it may also suffer from thermal or other conditions, such a circuit may encounter during its operation. In view of an applications or an implementation, it may be therefore advisable to implement a circuit for sensing a physical quantity, like a temperature.

Since a smartcard is a device to be carried around by a user, certain restrictions may apply to the implementable infrastructures. Due to these restrictions, for instance in the field of smartcards, a demand exists to employ circuits and infrastructures with a reduced complexity. However, embodiments according to the present invention that will be described below, may be also implemented as or in the context of other classes of devices than smartcards and other systems.

Figure 1:
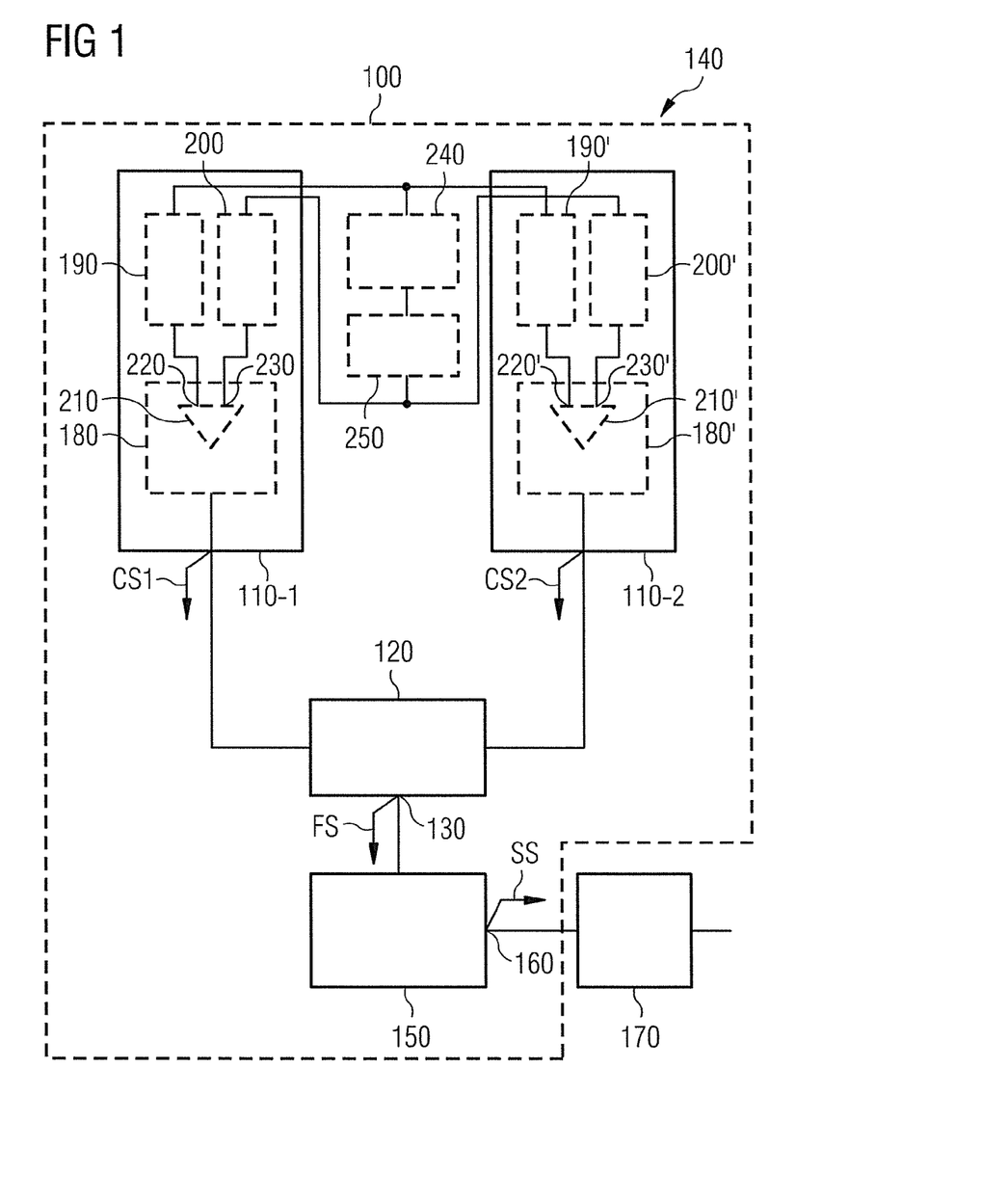
FIG. 1 shows a block diagram of a circuit for sensing a physical quantity according to an embodiment of the present invention comprising two oscillator circuits.

FIG. 1 shows a block diagram of a circuit 100 for sensing a physical quantity according to an embodiment of the present invention. The circuit 100 comprises a first oscillator circuit (OSC1) 110-1 and a second oscillator circuit (OSC2) 110-2, which are coupled to a frequency comparator circuit 120. The frequency comparator circuit 120 is operable to provide a frequency signal FS at an output 130. The frequency signal FS is indicative of the physical quantity to be sensed by the circuit 100.

The frequency signal FS is based on a first frequency and a second frequency of a first clock signal CS1 and a second clock signal CS2 provided by the first and second oscillator circuits 110-1, 110-2, respectively. The oscillator circuits 110 are operable to provide the respective clock signals CS1, CS2 such that the frequency of the respective oscillator circuit 110 depends on the physical quantity. However, to enable the frequency comparator circuit 120 to provide the frequency signal FS indicative of the physical quantity, the first and second oscillator circuits 110-1, 110-2 are operable to provide their respective clock signals CS1, CS2 in such a way that a change in the physical quantity causes one of the frequencies of the two clock signals CS1, CS2 to increase, while the other frequency decreases.

By employing two oscillator circuits 110 with at least locally opposing frequency characteristics as a function of the physical quantity, a circuit 100 according to an embodiment of the present invention may enable a simpler implementation and a more accurate sensing of the physical quantity since a measurement of the physical quantity is based on two oscillator circuits 110, which both depend on the physical quantity instead of using just one oscillator circuit 110 along with a reference oscillator providing a clock signal with a predefined and fixed frequency as a time basis. In other words, the circuit 100 according to an embodiment of the present invention uses a principle that a physical quantity may equally well be sensed by employing a non-constant "time basis" that varies with the physical quantity itself, instead of providing a fixed, predetermined and constant time basis. Therefore, in some embodiments according to the present invention, an implementation of an oscillating crystal or an oscillator with a fixed and predetermined frequency signal may be omitted.

Conventionally, such a reference clock signal with a predetermined and fixed frequency is generated, for instance, by implementing an oscillating crystal. However, implementing an oscillating crystal may be difficult in some applications. If, for instance, the circuit 100 according to an embodiment of the present invention is implemented on a single, monolithic integrated circuit, integrating the oscillating crystal may not be compatible with the underlying technology, or process parameters or other technological restraints. Moreover, due to application-related or cost restraints an implementation of an oscillating crystal may not be a viable option, either.

Under some circumstances, providing the reference clock signal with a fixed and predetermined frequency externally may not be an alternative either. This may be the case because such a reference clock signal is simply not available or cannot be trusted. The latter may for instance be the case in a security-related application, when the circuit 100 is, for instance, comprised in a smartcard 140, which is used to protect privileges, facilities or information. In such a case, the smartcard 140 may be subjected to attacks to gain access to the protected goods mentioned above. In other words, the smartcard 140 may be subjected to attempts of tampering.

Conventionally, as an alternative to implementing an oscillating crystal, a reference clock signal may also be provided by an appropriately compensated oscillator circuit. However, such an oscillator circuit is typically required to provide the reference clock signal under a wide range of specified and eventually unspecified operating conditions if it is to be implemented in a security-related application. Circuits like these, however, may eventually require a significant size or area on a die of an integrated circuit.

A circuit 100 according to an embodiment of the present invention may make use of a fact that such a reference oscillator circuit may be omitted in terms of sensing a physical quantity. A circuit 100 according to an embodiment of the present invention may therefore offer the opportunity to reduce the complexity of such a circuit and a demand for size considerably compared to implementing a reference oscillator circuit as described above. Moreover, it may even be possible to increase the accuracy of sensing the physical quantity, since the second oscillator circuit (OSC2) 110-2 also carries information concerning the physical quantity instead of just providing a constant time-base.

The circuit 100 further comprises an evaluation circuit 150, which is coupled to the output 130 of the frequency comparator circuit 120 to receive the frequency signal FS. The evaluation circuit 150 is operable to compare the frequency signal FS with a predetermined condition and provide a status signal SS at an output 160, when the frequency signal FS fulfills the predetermined condition.

The smartcard 140 may further comprise a counter measure circuit 170 which is operable to receive the status signal SS and to initiate a countermeasure upon receipt of the status signal SS. Among the possible countermeasures to be initiated by the countermeasure circuit 170, for example, is initiating a security reset of the smartcard 140, reducing a voltage level, and reducing a frequency of an operating clock signal.

Initiating a security reset of the smartcard 140 may be an advisable countermeasure, when the frequency signal FS indicates the presence of an attack on the smartcard 140 or another attempt to tamper with its content. Reducing a voltage level and reducing a frequency of an operating clock signal may be suitable countermeasures in case the smartcard 140 tends to overheat such that an energy amount dissipated by the smartcard 140 should be reduced to ensure its functionality and health.

In an embodiment according to the present invention, the frequency comparator circuit 120 may be operable, for instance, to provide the frequency signal FS such that it is indicative of a ratio of the frequency values of the first and second frequencies of the respective clock signals CS1, CS2. To facilitate this, the frequency comparator circuit 120 may be operable to provide the frequency signal FS based on counting a number of edges of one clock signal of the first and second clock signals CS1, CS2 during a period of time, which depends on a predefined number of edges, for instance falling or raising edges, of the other clock signal.

In other words, in one embodiment the frequency comparator circuit may for instance comprise a first and a second counter coupled to the first and second oscillator circuits 110-1, 110-2, respectively. The period of time may depend, for instance, on the predefined number of edges of the second clock signal CS2 as provided by the second oscillating circuit 110-2. In this case, the first counter coupled to the first oscillator circuit 110-1 may be controllable by the second counter in such a way that the first counter ceases counting the edges of the first clock signal CS1 when the second counter reaches the predefined number or, starting from the predefined number and counting downwards towards zero. When the second counter reaches zero or the predefined number, the number of edges as counted by the first counter is proportional to a product of the ratio of the two frequencies of the two clock signals CS1, CS2 and the predefined number.

In some embodiments according to the present invention, the frequency comparator circuit 120 may be operable such that the predefined number is a fixed or a programmable integer. The number of edges counted during the period of time of the first clock signal CS1 is proportional to a product of the predefined number and the aforementioned ratio of the two frequencies of the two clock signals CS1, CS2.

Naturally, in other embodiments according to the present invention, the first clock signal CS1 may be used to control the number of edges to be counted by the frequency comparator circuit 120. Depending on the implementation of the frequency comparator circuit 120 and its optionally implemented counters, rising edges (leading edges) or falling edges (trailing edges) may be counted. In other embodiments of a circuit 100, the frequency comparator circuit 120 may be implemented differently to provide the frequency signal FS optionally being indicative of a ratio of the frequency values of the first and second frequencies.

As outlined before, the optional evaluation circuit 150 may be operable to receive the frequency signal FS and to provide the status signal SS, when the frequency signal FS fulfills the predetermined condition. The predetermined condition may be fixed or programmable. For instance, in the case of a security-related implementation of the circuit 100 according to an embodiment of the present invention, it may be advisable to implement the predetermined condition in a fixed way. As a consequence, the predetermined condition may be more difficult to be altered by an attacker. Implementing a programmable predetermined condition might be more attractive under other circumstances because it may provide the user of the circuit 100 with a greater flexibility of determining actions depending on the physical quantity sensed by the circuit 100.

For instance, when the physical quantity is a temperature, the predetermined condition may be fulfilled when the temperature—or in more general terms—the physical quantity drops below or exceeds a predetermined threshold value. For instance, when the temperature drops below a predetermined threshold value, this may be interpreted as an attack on the smartcard 140 leading the countermeasure circuit 170 to initiate the security reset of the smartcard 140. The countermeasure circuit 170 is in this case triggered by the status signal SS provided by the evaluation circuit 150. Alternatively or additionally, when the temperature sensed by the circuit 100 exceeds a predetermined threshold value, it may be advisable to reduce the power consumption of the smartcard 140. In this case, the countermeasure circuit 170 may be adapted such that a voltage level, for instance a supply voltage level, or a frequency of an operating clock of the smartcard 140 is reduced to limit the power dissipated by the smartcard 140.

Hence, the evaluation circuit 150 may be operable such that the predetermined condition is fulfilled, when the ratio of the frequencies of the first and second clock signals CS1, CS2 exceeds or is less than a predetermined threshold.

In some embodiments of the circuit 100 according to the present invention, at least one oscillator circuit 110 of a first and second oscillator circuit 110-1, 110-2 is operable to provide the respective clock signal CS1, CS2 such that the respective frequency changes essentially non-linearly and, optionally, essentially non-inverse linearly with the physical quantity. As will be outlined below in more detail, this may facilitate an easier calibration of the circuit 100. For instance, the changes may be essentially polynomial (e.g. quadratic) or essentially inverse polynomial (e.g. inverse quadratic).

Before a possible implementation of an oscillator circuit 110 is outlined in more detail below, it should be mentioned that although the circuit 100 has been described so far only in the context of the smartcard 140, embodiments according to the present invention are by far not limited to being implemented in the framework of a smartcard. Moreover, it should also be noted that the evaluation circuit 150 may be adapted to provide more than one status signal SS or to provide a status signal SS with different states. In such a case, the countermeasure circuit 170 may be adapted such that different countermeasures may be initiated depending on the status of the status signal received from the evaluation circuit 150.

In the circuit 100 as shown in FIG. 1, each oscillator 110 comprises an oscillation generator 180, 180', a current source 190, 190' as well as a reference signal circuit 200, 200'. Each of the oscillation generators 180, 180' comprise a comparator 210, 210' with a first input 220, 220', respectively, and a second input 230, 230', respectively. The components denoted by an apostrophe (') are components of the second oscillator circuit (OSC2) 110-2, while the components without the apostrophes refer to the components of the first oscillator circuit (OSC1) 110-1.

For the sake of simplicity only, the structure of the first oscillator circuit 110-1 will be described in more detail in the following. As can be seen from FIG. 1, the same structure may also apply to the second oscillator 110-2. Naturally, in other embodiments according to the present invention the oscillators 110 may be implemented differently.

The oscillation generator 180 is adapted to provide the clock signal CS1 of the first oscillator 110-1. The current source 190 is coupled to the first input 220 of a comparator 210 and operable to provide a current with a magnitude depending on the physical quantity to be sensed by the circuit 100. The reference signal circuit 200 is coupled to the second input 230 of the comparator 210 and operable to provide a reference signal with a magnitude depending on the physical quantity. Once again, the current source 190 and the reference signal circuit 200 are operable to provide the current and the reference signal, respectively, such that due to an identical change in the physical quantity, the magnitude of the current or of the reference signal increases while the other magnitude of the current and the reference signal decreases. In other words, also the current source 190 and the reference signal circuit 200 comprise at least locally opposite dependencies with respect to the physical quantity.

The oscillator circuits 110 according to an embodiment of the present invention make also use of the fact that it is not necessary to implement a fixed reference signal circuit providing a fixed reference signal with a fixed, predetermined and constant magnitude. For the same reasons as mentioned above, the complexity of the oscillator circuit 110 may be reduced or simplified by implementing the reference signal circuit 200 such that the magnitude of the reference signal output by the reference signal circuit 200 depends on the physical quantity to be sensed by the circuit 100.

The reference signal circuit 200 may be a voltage source or a current source depending on the concrete implementation. However, a more detailed description of an embodiment of an oscillator circuit 110 according to the present invention will be given in context with FIGS. 7 and 8.

In the case outlined above, in which the physical quantity to be sensed or measured is the temperature, the current source 190 may be based on a Proportional-To-Absolute-Temperature current source (PTAT current source) and the reference signal circuit 200 may be based on a Complementary-To-Absolute-Temperature current source (CTAT current source) or vice-versa. Sometimes, the CTAT current source is also referred to as an Inverse-Proportional-To-Absolute-Temperature current source (IPTAT current source). However, since it may not be necessary to implement full sets of PTAT current sources and CTAT current sources for both oscillators 110-1, 110-2, the circuit 100 may further comprise a first bias generator 240 and a second bias generator 250. In the case of the physical quantity being the temperature, the current sources 190, 190' being based on a PTAT or a CTAT current source, while the respective reference signal circuits 200, 200' are based on the other alternative of PTAT and CTAT current sources, the first bias generator 240 may be a PTAT bias generator, while the second bias generator may be a CTAT bias generator. In the implementation shown in FIG. 1, the second bias generator 250 depends on an input signal provided by the first bias generator 240. As a consequence, the two bias generators 240, 250 are coupled. The first bias generator 240 is coupled to the current sources 190, 190' and the second bias generator 250 is coupled to the reference signal circuits 200, 200'.

Figure 2:
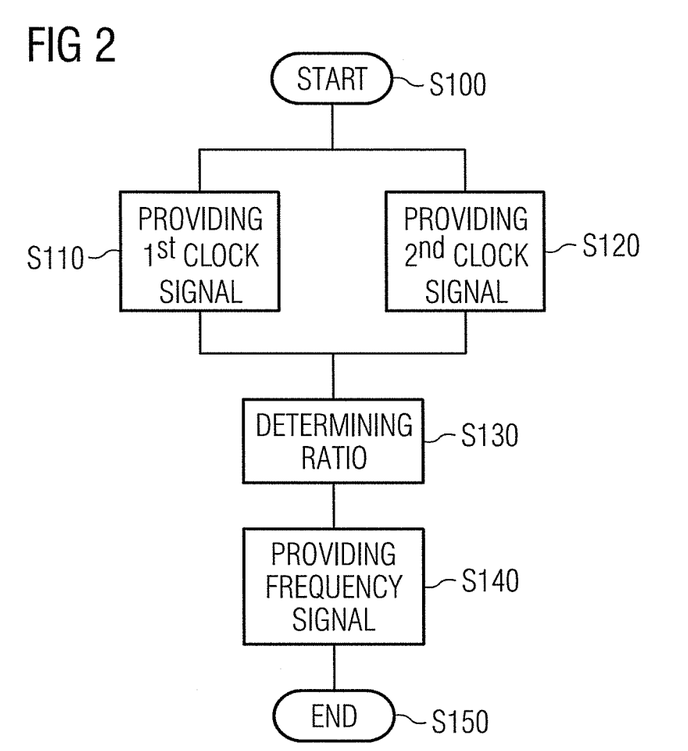
FIG. 2 shows a flow chart of a method according to an embodiment of the present invention.

FIG. 2 shows a flow chart of an embodiment of a method for sensing the physical quantity. After a start of the embodiment of the method in a step S100, the first clock signal CS1 is provided in a step S110. For instance, step S110 may be performed by the first oscillator circuit (OSC1) 110-1. In a parallel step S120, the second clock signal CS2 is provided, for instance, by the second oscillator circuit (OSC2) 110-2. In a step S130 the ratio of the frequency values of the first and second frequencies of the first and second clock signals CS1, CS2 are determined. Based on the ratio determined in step S130, the frequency signal FS is provided in a step S140, before the method according to an embodiment ends in a step 150.

While steps S110 and S120 of providing the first and second clock signals CS1, CS2, respectively, are typically performed by the first and second oscillator circuits 110-1, 110-2, steps S130 and S140 may be performed by the frequency comparator circuit 120. Steps S110 and S120 may be performed simultaneously by the two oscillator circuits 110, as outlined above. In principle, the steps S110 and S120 may also be performed sequentially or—in terms of time—fully or partially overlapping. In other words, the flow chart as shown in FIG. 2 does not necessarily represent an order in which the steps have to be performed. As outlined before, the method for sensing a physical quantity according to an embodiment of a present invention may comprise further steps as also outlined below.

However, before the oscillator circuits 110 according to an embodiment of the present invention will be described in more detail, possibilities, which some embodiments may offer, will be described along with further embodiments according to the present invention.

In the following embodiment description, the physical quantity will always be assumed to be the temperature without loss of generality.

A conventional temperature sensor is typically adjusted by measuring the response of the sensor at one or more reference temperatures. To illustrate this for a conventional voltage-based temperature sensor, FIG. 3 shows a diagram of an output voltage/temperature characteristic of an output voltage V in arbitrary units (a.u.) as a function of the temperature T in Centigrade (° C.).

Figure 3:
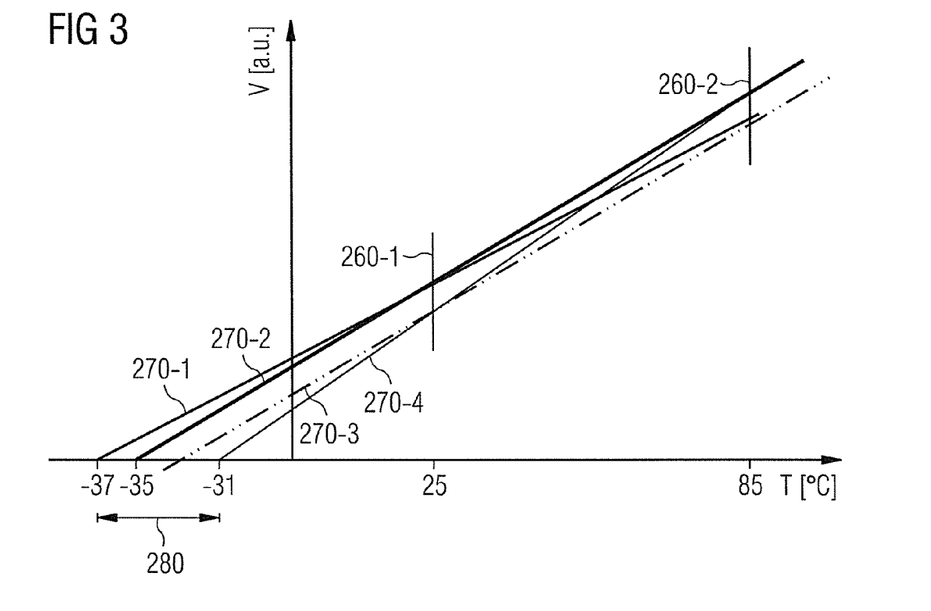
FIG. 3 illustrates an uncertainty of a determination of a temperature based on sensing the temperature as a function of a voltage level.

In the conventional temperature sensor, on which the illustration in FIG. 3 is based, a current is applied to the sensor and a resulting voltage is measured. The voltage depends linearly on the temperature. A comparator circuit evaluates the linear temperature-dependent voltage with a temperature-independent voltage. These measurements are performed during a calibration process at the reference temperatures 260-1 and 260-2 of 25° C. and at 85° C., respectively. Based on these measurements, a calculation of a low temperature sensor trigger point will be performed afterwards.

The conventional temperature sensor generates a PTAT-voltage, a CTAT-voltage and/or a temperature-independent voltage. It uses a voltage-comparison circuit to compare two of the aforementioned voltages. However implementing such a circuitry with a high resolution may consume a large area on an integrated circuit due to the necessary implementation of transmission gates and further infrastructures.

FIG. 3 shows several voltage/temperature characteristics 270-1, 270-2, 270-3 and 270-4, which are based on slight variations of the voltages present at the two reference temperatures 260, but which are considered by the voltage-comparison circuit to correspond to the same voltages. To be more precise, the characteristics 270-1 and 270-2 are based on the assumption that at the first reference temperature 260-1 of 25° C. the measured voltage differs from that of the other two characteristics 270-3, 270-4 by a little less than one resolution step of the comparison circuitry. Similarly, voltage dependencies 270-2 and 270-4 on the one hand and characteristics 270-1 and 270-3 on the other hand are assumed to be based on voltages corresponding to marginally less than a one-step difference concerning the resolution at the second reference temperature 260-2 of 85° C. Nevertheless, all voltages will result in the same voltage values being attributed to them by the voltage-comparison circuit.

This granularity with respect to the voltages translates into a granularity of the temperatures, as well. In the situation shown in FIG. 3, this will result in a granularity with respect to temperature of approximately 2 K. Since the temperature sensors are typically not only operated in the temperature regime between the two reference temperatures 260, but are also used to measure temperatures below and above, an error or a resulting granularity due to the finite voltage resolution may result in a significant uncertainty in terms of the sensed temperature. Under the circumstances and the situation shown in FIG. 3, due to extrapolating to lower temperatures the granularity may increase by a factor of 3.

Figure 4:
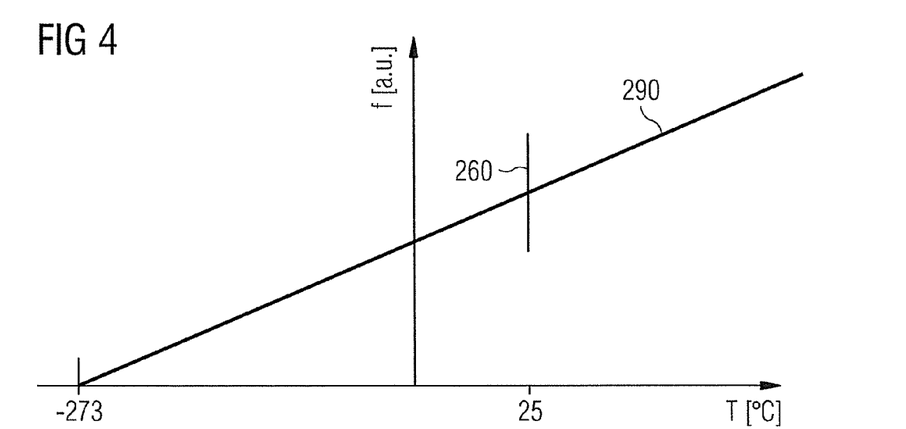
FIG. 4 illustrates a sensing principle of determining an absolute temperature based on determining a frequency.

FIG. 4 shows a frequency/temperature characteristic 290 based on a frequency measurement instead of a voltage measurement. To be more precise, FIG. 4 shows a dependency of the frequency f in arbitrary units (a.u.) as a function of the temperature in Centigrade (° C.).

The temperature sensor, on which the illustration of FIG. 4 is based, is calibrated at a single reference temperature 260 of 25° C. and implemented using a PTAT current source or a PTAT voltage source. Due to the linear characteristics of the PTAT current source or the PTAT voltage source, which will be described in more detail in context of FIGS. 7 and 9, after a conversion of the current into the frequency domain the frequency dependency 290 starts at a frequency of zero at the absolute zero point (0 K=−273.15° C.).

In other words, under ideal conditions, a single point measurement during the calibration process at the reference temperature 260 should be enough to provide enough data to calibrate the temperature sensor reliably on which the diagram of FIG. 4 is based. However, under field conditions, a highly precise time base might be necessary, which may be, for instance, implemented as a crystal oscillator or an external clock. As outlined before, such a highly precise time base may not always be available.

Figure 5:
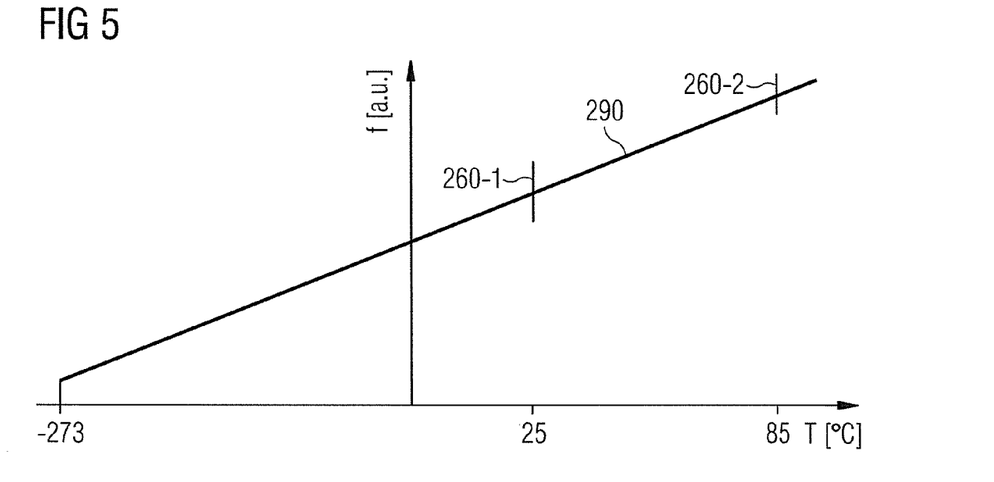
FIG. 5 illustrates a sensing principle for an absolute temperature based on determining a frequency, taking an offset into account.

To increase the accuracy of a temperature sensor, a two-point measurement during the calibration process may be used. To illustrate this, FIG. 5 illustrates another frequency dependency 290, which is based on acquiring the frequency values at a first reference temperature 260-1 of 25° C. and at a second reference temperature 260-2 of 85° C. As a consequence, a deviation from the absolute zero point may be taken into consideration to increase the accuracy of the determination of a temperature.

However, although such a sensor calibrated at two reference temperatures 260 may work more precisely, under field conditions in contrast to test conditions once again a highly precise time base should be present, which is not necessarily available. However, to realize the additional accuracy of this conventional approach, it might be necessary under field conditions to implement an appropriate source.

Figure 6A:
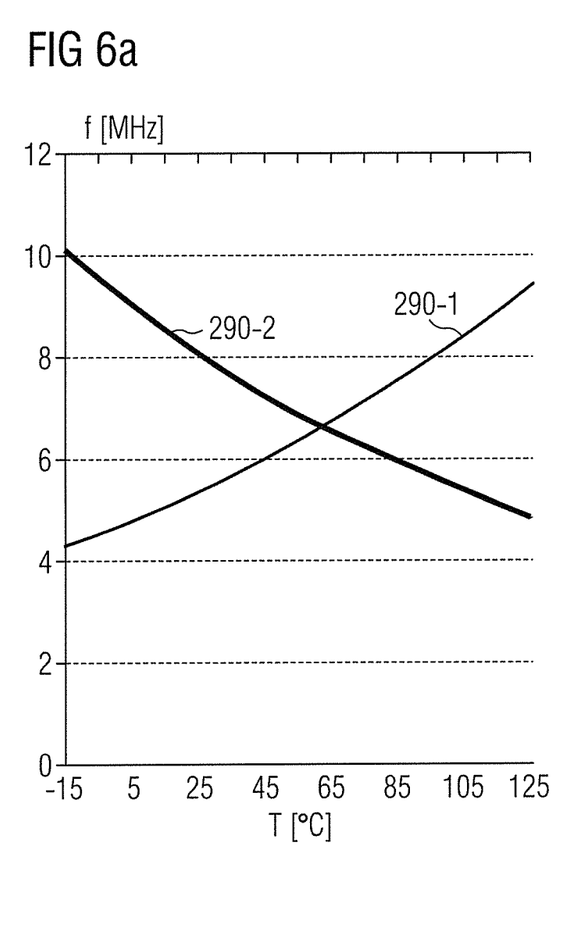
FIG. 6a shows two frequency/temperature characteristics of two clock signals provided by two oscillator circuits according to an embodiment of the present invention, illustrating a calibration and measurement process.

FIG. 6a shows two frequency dependencies 290-1, 290-2 of oscillator circuits 110-1, 110-2 of a circuit 100 according to an embodiment of the present invention as shown in FIG. 1. The first oscillator circuit (OSC1) 110-1 comprises a monotonically increasing frequency/temperature-characteristic 290-1, which changes essentially quadratically with temperature. The second oscillator circuit (OSC2) 110-2 comprises a monotonically decreasing frequency/temperature-characteristic 290-2, which changes essentially inverse quadratically with temperature. In the temperature range shown in FIG. 6a of approximately −15° C. to approximately 125° C., the frequencies of both oscillator circuits 110 vary in the range between approximately 4 MHz and approximately 10 MHz.

Figure 6B:
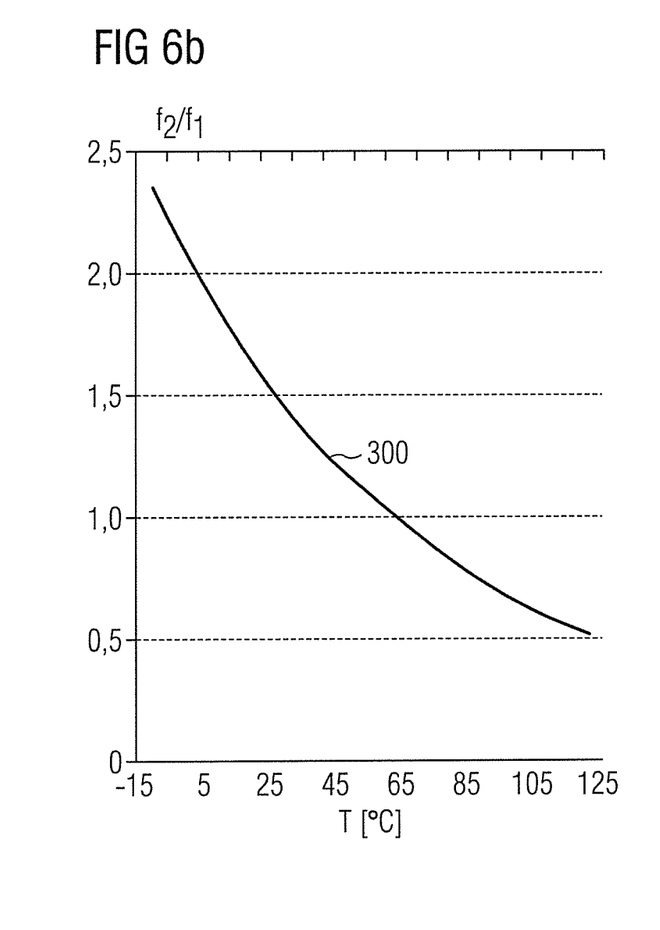

In the embodiment of the circuit 100 as shown in FIG. 1, the frequency comparator circuit 120 may be adapted to provide the frequency signal such that it is indicative of a ratio of the frequencies of the two oscillator circuits 110-1, 110-2. To achieve this, FIG. 6b shows a ratio/temperature characteristic 300, which is based on a ratio of the frequency $f_2$ of the second oscillator circuit 110-2 with respect to the frequency $f_1$ of the first oscillator circuit 110-1. In other words, FIG. 6b shows the ratio $f_2/f_1$ as a function of the temperature for the frequency/temperature characteristics 290 of FIG. 6a. The ratio varies in the temperature range of −15° C. to approximately 125° C. from approximately 2.4 to approximately 0.5. The ratio is monotonically decreasing in this temperature range. It is therefore indicative of the temperature. Hence, a frequency signal FS comprising information on the aforementioned ratio is also indicative of the temperature.

Figure 7:
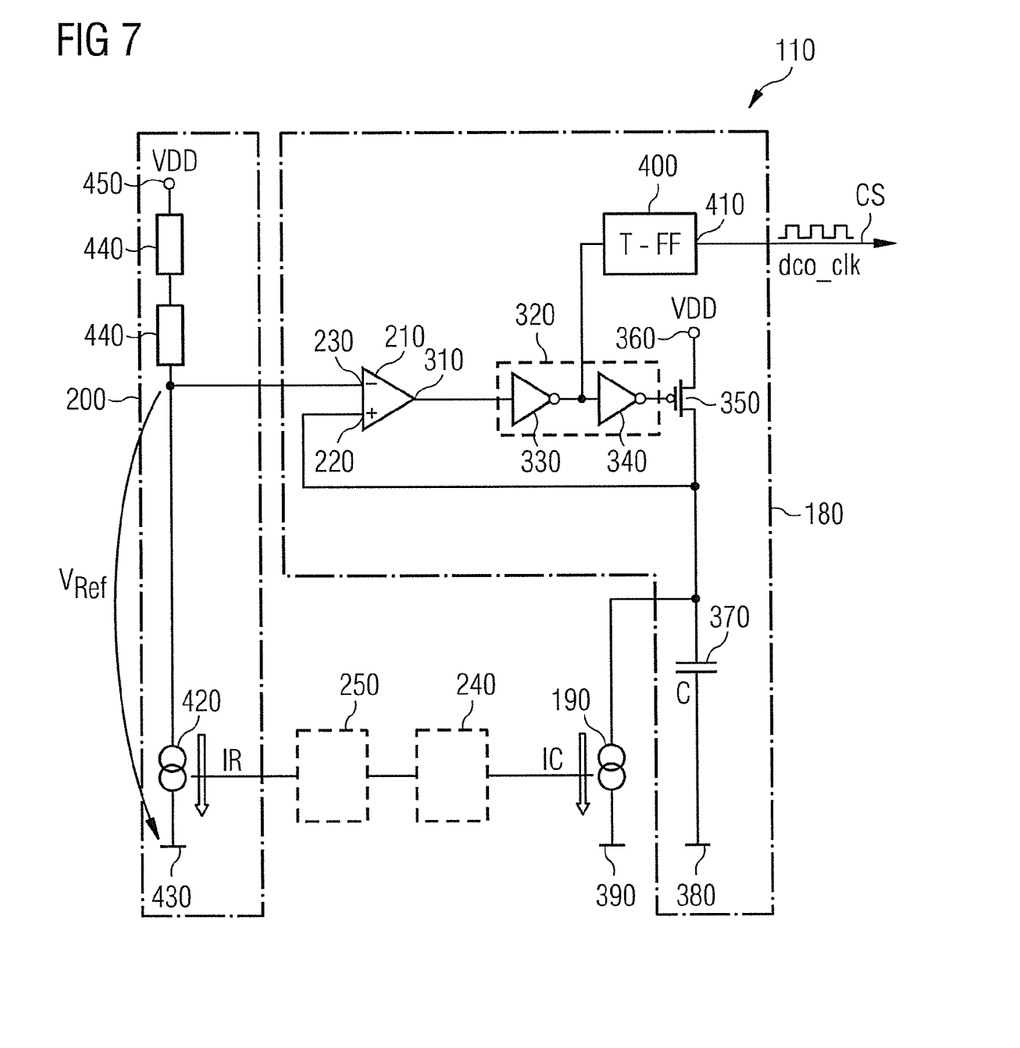
FIG. 7 shows a simplified circuit diagram of an oscillator circuit according to an embodiment of the present invention.

FIG. 7 shows a circuitry diagram of an oscillator circuit 110 according to an embodiment of the present invention. The oscillator circuit 110 comprises the oscillation generator 180, the current source 190, and the reference signal circuit 200 as already shown in FIG. 1.

The oscillation generator 180 comprises the comparator 210 with its first input 220 and its second input 230. The first input 220 is a non-inverting input of the comparator 210, while the second input 230 is an inverting input. An output 310 of a comparator is coupled to a driver circuit 320 which comprises a first CMOS-inverter 330 and a second CMOS-inverter 340 (CMOS=Complementary Metal Oxide Semiconductor) which are coupled in series. To be more precise, the output 310 of the comparator 210 is coupled to an input of the first CMOS-inverter 330, an output of which is coupled to an input of the second CMOS-inverter 340.

An output of the driver circuit 320 and, hence, of the second CMOS-inverter 340 is coupled to a control terminal of a transistor 350. The transistor 350 is implemented in the oscillator circuit 110 according to an embodiment of the present invention as a PMOS-transistor (PMOS=p-channel Metal Oxide Semiconductor). As a consequence, the control terminal is a gate terminal of the transistor.

The transistor 350 further comprises a first terminal and a second terminal. The first terminal is coupled to the first input 220 of the comparator 210. The second terminal of the transistor 350 is coupled to a supply voltage terminal 360 at which the positive supply voltage VDD is obtainable.

The oscillation generator 180 further comprises a capacitor 370 with a capacitance C, which is coupled in parallel to the current source 190 between the first terminal of the transistor 350 and terminals 380, 390 for a reference potential VSS. The reference potential may be a ground (GND) potential. The terminal for the reference potential 380 is coupled to the capacitor 370, while the terminal 390 is coupled to the current source 190.

The oscillation generator 180 further comprises a flip-flop 400 which is coupled in between the two CMOS-inverters 330, 340. The flip-flop 400 is implemented in one embodiment as a T-flip-flop, which is operable to toggle between a first state and a second state when a signal with a predetermined edge is provided to the flip-flop 400. The predetermined edge may be either a falling or a rising edge. An output 410 of the flip-flop 400 represents an output of the oscillation generator 180 at which the clock signal CS or dco_clk is obtainable. Therefore, the output 410 of the flip-flop 400 also represents the output of the oscillation generator 180.

The oscillator circuit 110 further comprises the reference signal circuit 200. The reference signal circuit 200 comprises a further current source 420, which is coupled in between a terminal 430 of a reference potential 430 and the second input 230 of a comparator 210. The reference signal circuit 200 further comprises one or more resistors 440, which are coupled in between the further current source 420 and the second input 230 of the comparator 210 and a supply voltage terminal 450 for the supply voltage VDD.

Furthermore, as already illustrated in FIG. 1, the current source 190 is coupled to the optional first bias generator 240, while the reference signal circuit 200 or, to be more precise, the further current source 420 is coupled to the second bias generator 250. Both, the first and the second bias generator 240, 250 may be interconnected.

It is once again to be noted, that the first and second bias generators 240, 250 do not have to be part of the oscillator circuit 110. However, in some embodiments according to the present invention they may be part of the oscillator circuit 110.

Furthermore, it is to be noted that many of the structures shown may be implemented differently. For instance, instead of a PMOS-transistor as the transistor 350, also a bipolar transistor may be used. Moreover, it is not necessary to implement more than one resistor 440. In the present case, the oscillator circuit 110 according to an embodiment of the present invention comprises a series of resistors 440, which may be used for fine trimming the reference signal circuit 200.

Figure 8:
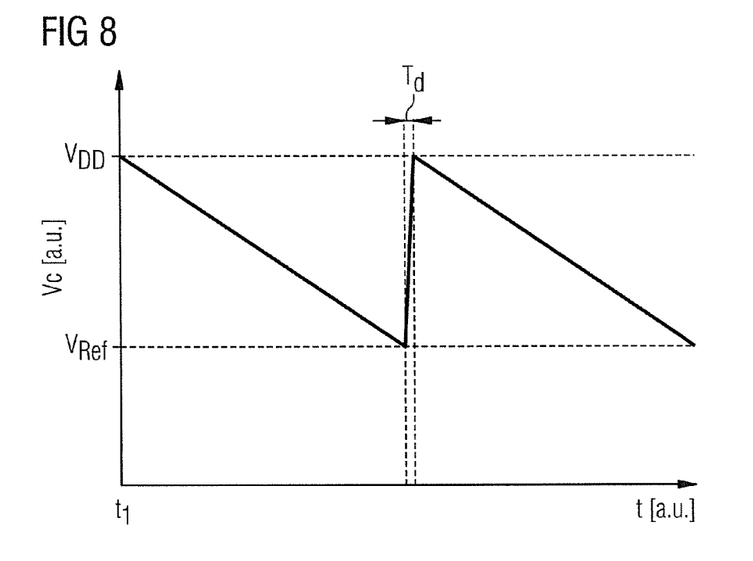
FIG. 8 shows a time dependence of a voltage across a capacitor of the oscillator shown in FIG. 7.

To illustrate the operation of the oscillator circuit 110 as shown in FIG. 7, FIG. 8 shows a diagram of a voltage $V_c$ across the capacitor 370 in arbitrary units (a.u.) as a function of time t. Starting at a point in time $t_1$, at which the transistor 350 has just been turned off by the driver circuit 320 and, hence, the supply voltage terminal 360 has just been decoupled from the capacitor 370, the current source 190 discharges the capacitor 370 linearly over time. As a consequence, the voltage $V_c$ across the capacitor 370 decreases from a starting value approximately equal to the supply voltage VDD until a voltage level $V_{Ref}$ is reached, which is caused by the further current source 420. When the voltage across the capacitor 370 reaches the voltage level $V_{Ref}$, the comparator 210 provides at its output 310 a signal, which is inverted by the first CMOS-inverter 330 and provided to the flip-flop 400. Moreover, the inverted signal of the first CMOS-inverter 330 is provided to the second CMOS-inverter 340 providing to the control terminal of the transistor 350 a signal, which causes the transistor 350 to turn on, in other words, to become conducting. The supply voltage terminal 360 will be connected to the capacitor 370. When the transistor 350 is implemented as a large transistor with a low resistance, the capacitor 370 may be charged quickly back to its original voltage, which is approximately equal to the supply voltage VDD.

Due to the rising voltage across the capacitor 370, the comparator 210 is provided with a voltage larger than the potential $V_{Ref}$ provided by the reference signal circuit 200. As a consequence, the driver circuit 320 provides the transistor 350 with a signal, which causes the transistor 350 to turn off again. However, the flip-flop 400 is also provided with a signal of the opposite edge.

As a consequence, the flip-flop 400 is provided with one falling and one rising edge for each charging cycle of the capacitor 370. Therefore, every two charging cycles, the same, predetermined edge is present at an input of the flip-flop 400. This will result in the clock signal CS being output at the output 410 of the flip-flop 400 with a frequency half that of the charging cycle. However, the duty cycle of the clock signal CS is 1:1.

Since the frequency of the charging of the capacitor 370 is determined by comparison of the voltages across a capacitor 370 (voltage $V_c$) and the voltage across the resistors 440 (voltage $V_R$; $V_R = V_c$), wherein R is the overall resistance of the resistors 440, a frequency f of the clock signal CS is given by $$f = 1/(2RC\, I_R/I_C + T_d),$$

wherein $I_R$ is the current of the further current source 420 and $I_c$ is the magnitude of the current of the current source 190. $T_d$ represents a charging time of the capacitor 370, which may be significantly shorter than a discharging time. While the discharging time is at least partially determined by the current source 190, the charging time is at least determined by the transistor 350, which is—at least in this embodiment—implemented as a large transistor. Moreover, $T_d$ may depend on the temperature and the underlying process technology. However, in many cases these may be neglected in a good approximation, if the frequency of the oscillator circuit 110 is chosen to be low enough. A frequency sufficiently low for the variations to be neglected, may be in the range of several MHz or several 10 MHz. By adjusting the lowest frequency to be less than 5 MHz, for all practical purposes, the variations contributing to $T_d$ may be, therefore, small or low enough.

As a consequence, the frequency is proportional to a ratio of the magnitudes of the currents $I_c$ to $I_R$, wherein k is a constant:

$$f = k\, I_C/I_R$$

Changes in the magnitude of the current $I_c$ of the current source are precisely transferred into the frequency, since they relate directly to the time necessary for discharging the capacitor 370. On the other hand, the magnitude $I_R$ of the further current source 420 merely causes the voltage $V_R$ to vary so that the frequency is indirectly proportional to this current. However, its range may be limited.

Figure 9:
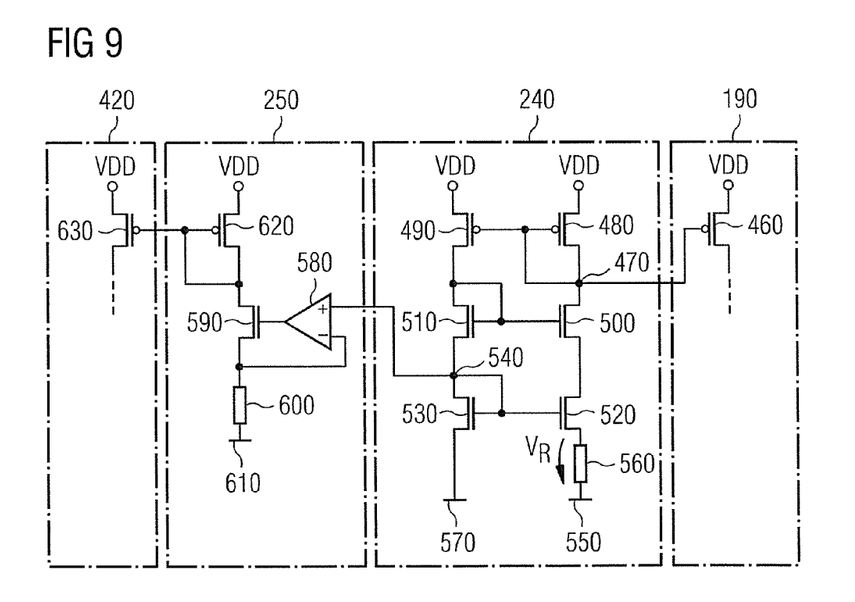
FIG. 9 shows a circuit diagram of a current source, a PTAT bias generator, a CTAT bias generator, and a further current source as employed in the oscillator circuit of FIG. 7.

FIG. 9 shows a circuit diagram of the two bias generators 240, 250 and their interconnection to the current source 190 and the further current source 420 according to one embodiment. The current source 190 is formed by a PMOS-transistor 460. A gate terminal of the PMOS-transistor 460 (PMOS=p-channel Metal Oxide Semiconductor) is coupled to a node 470 of the first bias generator 240, which is implemented as a PTAT-bias generator based on a Widlar-current source.

The first bias generator 240 comprises a first NMOS-transistor 520 (NMOS=n-channel Metal Oxide Semiconductor) and a second NMOS-transistor 530, wherein the drain terminal of the first NMOS-transistor 520 is coupled to a source terminal of a third NMOS-transistor 500, while a drain terminal of the second NMOS-transistor 530 is coupled to a source terminal of a fourth NMOS-transistor 510. The drain terminal of the second NMOS-transistor 530 is furthermore coupled to a further node 540, which is also coupled to both gate terminals of the first and second NMOS-transistors 520, 530.

The bias generator 240 further comprises a first PMOS-transistor 480 and a second PMOS-transistor 490, which are coupled to form a current mirror, wherein the two gate terminals of the two PMOS-transistors 480, 490 are coupled to the node 470.

The third NMOS-transistor 500 and the fourth NMOS-transistor 510 are part of a cascode wherein a drain terminal of the third NMOS-transistor 500 is coupled to the node 470. A drain terminal of the fourth NMOS-transistor 510 is coupled to both gate terminals of the two NMOS-transistors 500, 510.

A resistor 560 is coupled in between the source terminal of the first NMOS-transistor 520 and a terminal 550 for the reference potential VSS. As a consequence, the first PMOS-transistor 480, the first NMOS-transistor 520, the third NMOS-transistor 500 and the resistor 560 form a series connection in between the terminal 550 for the reference potential and a terminal for the supply voltage VDD. On the other side of the current mirrors, the second PMOS-transistor 490, the second NMOS-transistor 530 and the fourth NMOS-transistor 510 form a series connection between a terminal 570 for the reference potential and a terminal for the supply voltage VDD. In the embodiment shown at least partly in FIG. 9, the resistor 560 comprises a resistance value high enough such that the first and second NMOS-transistors 520, 530 are operated in their weak inversion regimes.

As outlined before, the first bias generator 240 is a PTAT-bias generator. Accordingly, the first NMOS-transistor 520 and the second NMOS-transistor 530 differ in terms of their dimensions. To be more precise, in the embodiment shown in FIG. 9, the first NMOS-transistor 520 may be capable of carrying approximately 8 times the current of the second NMOS-transistor 530. As a consequence, the first and second NMOS-transistors 520, 530 along with the resistor 560 create a voltage $V_R$, which is proportional to the absolute temperature.

The second bias generator 250 comprises an operational amplifier 580, which is coupled to the further node 540 of the first bias generator. An output of the operational amplifier 580 is coupled to a gate terminal of a NMOS-transistor 590, while a source terminal of the NMOS-transistor is coupled to an inverting input of the operational amplifier 580. As a result, the further node 540 is coupled to a non-inverting input of the operational amplifier 580. The source terminal of the NMOS-transistor 590 is furthermore coupled via a resistor 600 to a terminal 610 for the reference potential. The second bias generator 250 further comprises a PMOS-transistor 620, which is coupled in between a terminal for the supply voltage VDD and the drain terminal of the NMOS-transistor 590. Furthermore, a gate terminal of the PMOS transistor 620 is also coupled to the drain terminal of the NMOS-transistor 590. The further current source 420 also comprises a PMOS-transistor 630, a gate terminal of which is also coupled to the gate terminal of the PMOS transistor 620 of the second bias generator 250. Accordingly the two PMOS-transistors 620, 630 form a current mirror.

By providing the voltage across the second NMOS-transistor 530 to the non-inverting input of the operational amplifier 580, and by taking the output of the operational amplifier 580 to control the gate terminal of the NMOS-transistor 590, the (approximately) inverse proportional temperature dependence of the voltage across the second NMOS-transistor 530 as a function of temperature is used to control the PMOS-transistor 630 of the further current source 420. Therefore, the second bias generator 250 is also referred to as a CTAT-bias generator or an IPTAT-bias generator.

As a consequence, the current source 190 is, in the embodiment shown in FIG. 9, based on a PTAT current source, while the further current source 420 is based on a CTAT current source.

Figure 10A:
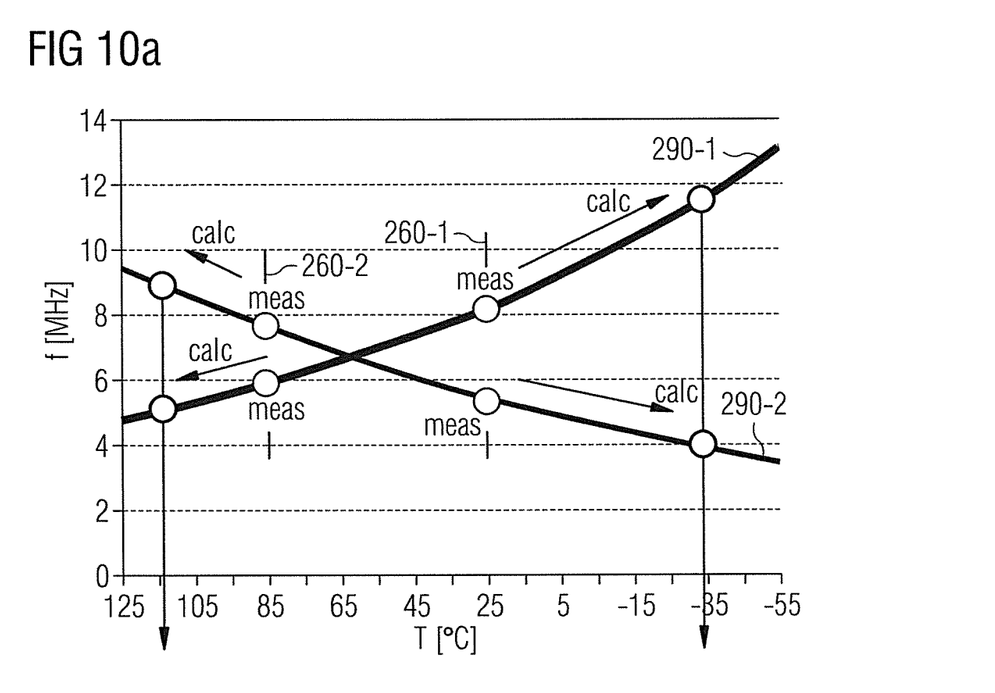
FIG. 10a shows two frequency/temperature characteristics of two clock signals provided by two oscillator circuits according to an embodiment of the present invention, illustrating a calibration and measurement process.
Figure 10B:
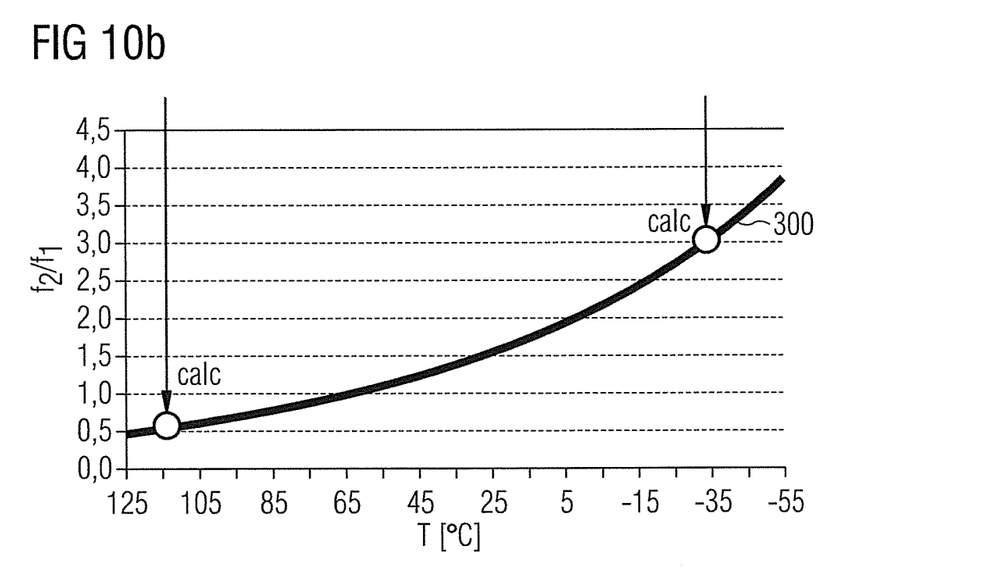

FIGS. 10a and 10b show similar diagrams as the FIGS. 6a and 6b. However, it is to be noted that the common temperature axis of the two diagrams is reversed with respect to the illustration in FIGS. 6a and 6b. While FIG. 10a shows two frequency/temperature characteristics 290, the FIG. 10b shows the resulting ratio/temperature characteristic 300 of the two frequency/temperature characteristics 290 shown in FIG. 10a.

FIGS. 10a and 10b illustrate the use of two oscillators 110-1, 110-2 as illustrated in the context of FIG. 1 for a frequency measurement at two different reference temperatures 260-1, 260-2. The two reference temperatures are chosen to be 25° C. and 85° C. Due to the different behavior with respect to temperature of the oscillator circuits 110-1, 110-2, the frequency/temperature characteristics 290-1, 290-2 of the two oscillator circuits 110-1, 110-2 respectively, are formed. However, it is to be noted that oscillators 110 having identical temperature dependence in terms of their frequencies may not work since these typically do not provide a temperature dependent ratio. Naturally, other reference temperatures 260 than the temperatures mentioned, may be used.

In the embodiment shown here, the frequency dependencies of the first and second oscillator circuits 110-1, 110-2 are given by $$f = b_1 T/(1 - a_1 T)$$

and $$f = (1 - a_2 T)/b_2 T.$$

By measuring the two frequency values at the two reference temperatures 260, a system of equations with two unknown variables ($a_1$, $b_1$; $a_2$, $b_2$) is to be solved. Therefore, for both oscillators 110 the frequency/temperature characteristics f(T) may be predictable. As a consequence, the ratio of the frequencies and, hence, the timer values may be used to initiate countermeasures or to sense the temperature.

Naturally, a circuit 100 for sensing a temperature or—in general terms—a physical quantity does not have to implement oscillator circuits 110 according to an embodiment of the present invention. Different combinations for current sources or reference signal circuits may be used, however, a combination of a current source 190 and a further current source 420 of the reference signal circuit 200 with a positive and a negative gradient might give an improved accuracy. In other words, the first oscillator 110-1 may be based on a current source 190 implemented as a CTAT-based current source, while the further current source 420 may be implemented as a PTAT-based current source. Accordingly, the second oscillator 110-2 may be implemented such that the current source 190 is a PTAT-based current source, while the further current source 420 is a CTAT- or IPTAT-based current source.

The embodiment of the circuit 100 as shown in FIG. 1 may therefore be based on generating a PTAT-based voltage and a CTAT-based voltage. The voltages may be transferred into linear currents, depending on the temperature, and then transferred by the oscillation generator 180 into two oscillator frequencies with different dependencies with respect to the physical quantity, for instance, the temperature. A circuit 100 may for instance be implemented as a temperature sensor or a temperature monitor. Such a temperature sensor may eventually be capable of providing a higher accuracy, a lower area and a smaller susceptibility to distortions.

A circuit 100 according to an embodiment of the present invention may therefore allow reducing the area necessary to implement such a circuit compared to a conventional design based on comparing and evaluating a voltage level without using the frequency. It may be possible to reduce the area of circuits of up to 50% for some circuits 100 according to an embodiment of the present invention. However, also smaller or even larger area reductions may be achievable. Moreover, due to using the frequency instead of a voltage, a circuit 100 according to an embodiment of the present invention may not be necessarily restricted by the granularity caused by the comparator circuit. It might therefore be possible to achieve a higher accuracy. Dynamic distortions may eventually be averaged out, which may result in an alarm situation in a conventional approach.

Furthermore, a circuit 100 according to an embodiment of the present invention may be able to satisfy future accuracy demands more easily, since a higher accuracy may be achievable by increasing the number of edges (predefined number) to be counted. Furthermore, the number of devices to be fabricated to a higher degree of accuracy may be reducible compared to a conventional design. Therefore, the design may become more robust in terms of a spread in the series of a production.

Furthermore, a circuit 100 according to an embodiment of the present invention as well as the other embodiments according to the present invention may offer an easier access to higher or lower temperatures due to employing PTAT-based and CTAT-based current sources during operation in the field and the possibility of acquiring a higher accuracy. As a consequence, it may be possible to employ less strict test conditions during the calibration process. The costs for the test equipment for calibrating embodiments according to the present invention may be, therefore, reducible. Moreover, estimates indicate that a current consumption may be approximately in the same range as a conventional approach.

By employing two oscillator circuits 110 or by employing a current source and a reference signal circuit with opposing temperature dependencies, the absolute values of the oscillator frequencies may become of no further importance. Therefore, precise, predetermined and fixed reference oscillators do not need to be implemented. Naturally, depending on the concrete implementation of an embodiment, they may be part of a circuit 100 or another embodiment according to the present invention. However, in some embodiments the determination of the temperature or the physical quantity may be reducible to determine the ratio of the frequencies. Therefore, monitoring a temperature or another physical quantity at a wider range of temperatures may become feasible with less effort.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements shown in the Figures, including any functional blocks labeled as "means", "means for forming", "means for determining" etc., may be provided through the use of dedicated hardware, such as "a former", "a determiner", etc. as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes, which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons.

Furthermore, in some embodiments a single step may include or may be broken into multiple substeps. Such substeps may be included and part of the disclosure of this single step unless explicitly excluded.

What is claimed is:

1. A circuit for sensing a physical quantity, the sensing circuit comprising:
a first oscillator circuit configured to provide a first clock signal comprising a first frequency depending on the physical quantity;
a second oscillator circuit configured to provide a second clock signal comprising a second frequency depending on the physical quantity; and
a frequency comparator circuit configured to provide a frequency signal indicative of the physical quantity, the frequency signal being based on the first frequency and the second frequency,
wherein the first oscillator circuit and the second oscillator circuit are configured to provide the first clock signal and the second clock signal, respectively, such that due to a change in the physical quantity one frequency of the first frequency and the second frequency increases, while the other frequency of the first frequency and the second frequency decreases,
wherein at least one oscillator circuit of the first oscillator circuit and the second oscillator circuit is configured to provide the respective first clock signal and second clock signal such that the respective frequency changes essentially non-linearly with the physical quantity.

2. The circuit according to claim 1, wherein the frequency comparator circuit is configured to provide the frequency signal such that it is indicative of a ratio of the frequency values of the first frequency and the second frequency.

3. The circuit according to claim 1, wherein the sensing circuit is implemented on a single, monolithic integrated circuit.

4. The circuit according to claim 1, wherein the physical quantity is a temperature.

5. The circuit according to claim 1, wherein at least one oscillator circuit of the first oscillator circuit and the second oscillator circuit comprises:
an oscillation generator configured to provide a clock signal, the oscillation generator comprising a comparator;
a current source coupled to a first input of the comparator and configured to provide a current at least partially charging or discharging a capacitance, the current comprising a magnitude depending on the physical quantity; and
a reference signal circuit coupled to a second input of the comparator and configured to provide a reference signal, the reference signal comprising a magnitude depending on the physical quantity,
wherein the current source and the reference signal circuit are configured to provide the current and the reference signal, respectively, such that due to a change in the physical quantity the magnitude of the current or of the reference signal increases, while the other magnitude of the current and the reference signal decreases.

6. The circuit according to claim 1, wherein the frequency comparator circuit is configured to provide the frequency signal based on counting a number of edges of one clock signal of the first clock signal and the second clock signal during a period of time, the period of time depending on a predefined number of edges of the other clock signal of the first clock signal and the second clock signal.

7. The circuit according to claim 6, wherein the frequency comparator circuit is configured such that the predefined number is a fixed integer or a programmable integer.

8. The circuit according to claim 1, further comprising an evaluation circuit configured to receive the frequency signal and provide a status signal in response thereto, when the frequency signal fulfills a predetermined condition.

9. The circuit according to claim 8, wherein the evaluation circuit is configured such that the predetermined condition is fixed or programmable.

10. The circuit according to claim 8, wherein the frequency comparator circuit is configured to provide the frequency signal such that it is indicative of a ratio of the frequency values of the first frequency and the second frequency, and wherein the evaluation circuit is configured such that the predetermined condition is fulfilled, when the ratio exceeds a first predetermined threshold or is less than a second predetermined threshold.

11. An oscillator circuit, comprising:
an oscillation generator configured to provide a clock signal, the oscillation generator comprising a comparator;
a current source coupled to a first input of the comparator and configured to provide a current, the current comprising a magnitude depending on the physical quantity; and
a reference signal circuit coupled to a second input of the comparator and configured to provide a reference signal, the reference signal comprising a magnitude depending on the physical quantity,
wherein the current source and the reference signal circuit are configured to provide the current and the reference signal, respectively, such that due to a change in the physical quantity the magnitude of the current or of the reference signal increases, while the other magnitude of the current and the reference signal decreases.

12. The oscillator circuit according to claim 11, wherein the oscillation generator further comprises a flip-flop coupled to the output of the comparator, the flip-flop being configured to toggle between a first state and a second state when a signal with a predetermined edge is provided to the flip-flop.

13. The oscillator circuit according to claim 11, wherein at least one circuit of the current source and the reference signal circuit is configured to provide the current or the reference signal such that the magnitude changes linearly or inverse linearly with the physical quantity.

14. The oscillator circuit according to claim 11, wherein the reference signal circuit comprises a further current source and a resistor, wherein the reference signal circuit is configured to provide voltage to the second input of the comparator.

15. The oscillator circuit according to claim 11, wherein the physical quantity is a temperature.

16. The oscillator circuit according to claim 11, wherein the current source is based on a proportional-to-absolute-temperature current source and the reference signal circuit is based on a complementary-to-absolute-temperature current source, or wherein the current source is based on a complementary-to-absolute-temperature current source and the reference signal circuit is based on a proportional-to-absolute-temperature current source.

17. The oscillator circuit according to claim 11, wherein the oscillation generator further comprises a capacitor and wherein the current source is coupled to the capacitor such that the current source is configured to charge or to discharge the capacitor.

18. The oscillator circuit according to claim 17, wherein the oscillation generator further comprises a transistor with a first terminal, a second terminal and a control terminal, the first terminal being coupled to the current source and the capacitor, the second terminal being coupled to a supply voltage terminal, and the control terminal being coupled to an output of the comparator.

19. The oscillator circuit according to claim 18, wherein the oscillation generator further comprises a driver circuit coupled between the output of the comparator and the control input of the transistor.

20. A smartcard, comprising:
a first oscillator circuit configured to provide a first clock signal comprising a first frequency depending on a physical quantity;
a second oscillator circuit configured to provide a second clock signal comprising a second frequency depending on the physical quantity;
a frequency comparator circuit configured to provide a frequency signal indicative of the physical quantity, the frequency signal being based on the first frequency and the second frequency;
an evaluation circuit configured to receive the frequency signal, the evaluation circuit further configured to compare the frequency signal with a predetermined condition and provide a status signal, when the frequency signal fulfills the predetermined condition; and
a countermeasure circuit, wherein the countermeasure circuit is configured to receive the status signal and initiate a countermeasure upon receipt of the status signal,
wherein the first and second oscillator circuits are configured to provide the first clock signal and the second clock signals such that due to a change in the physical quantity one frequency of the first frequency and the second frequency increases, while the other frequency of the first frequency and the second frequency decreases.

21. The smartcard according to claim 20, wherein the countermeasure circuit is configured such that the initiated countermeasure is at least one of a group of countermeasures, the group of countermeasures comprising: initiating a security reset of the smart card, reducing a voltage level, and reducing a frequency of an operating clock signal.

22. A temperature sensing circuit, comprising:
a first oscillator circuit comprising:
a first oscillation generator configured to provide a first clock signal, the first clock signal comprising a first frequency, the first oscillation generator comprising a first comparator;
a first current source coupled to a first input of the first comparator and configured to provide a first current, the first current comprising a magnitude depending on the temperature; and
a first reference signal circuit coupled to a second input of the first comparator and configured to provide a first reference signal, the first reference signal comprising a magnitude depending on the temperature,
wherein the first current source is configured to provide the first current such that due to a change in the temperature the magnitude of the first current increases,
wherein the first reference signal circuit is configured to provide the first reference signal such that due to a change in the temperature the magnitude of the first reference signal decreases;
a second oscillator circuit comprising:
a second oscillation generator configured to provide a second clock signal, the second clock signal comprising a second frequency, the second oscillation generator comprising a second comparator;
a second current source coupled to a first input of the second comparator and configured to provide a second current, the second current comprising a magnitude depending on the temperature; and
a second reference signal circuit coupled to a second input of the second comparator and configured to provide a second reference signal, the second reference signal comprising a magnitude depending on the temperature,
wherein the second current source is configured to provide the second current such that due to a change in the temperature the magnitude of the second current decreases,
wherein the second reference signal circuit is configured to provide the second reference signal such that due to a change in the temperature the magnitude of the second reference signal increases;
a frequency comparator circuit coupled to the first oscillator circuit and the second oscillator circuit, the frequency comparator configured to provide a frequency signal indicative of the temperature, the frequency signal being based on the first frequency and the second frequency,
wherein the first oscillator circuit and the second oscillator circuit are configured to provide the first clock signal and the second clock signal, respectively, such that due to a change in the physical quantity one frequency of the first frequency and the second frequency increases, while the other frequency of the first frequency and the second frequency decreases; and
wherein the first oscillator circuit and the second oscillator circuit are configured to provide the respective clock signal such that the respective frequency changes essentially non-linearly with the physical quantity.

* * * * *